United States Patent [19]

Nakajima

[11] 3,975,991

[45] Aug. 24, 1976

[54] HYDRAULIC CYLINDER

[75] Inventor: Chugi Nakajima, Yokohama, Japan

[73] Assignee: Ishikawajima-Harima Jukogyo Kabushiki Kaisha, Tokyo, Japan

[22] Filed: July 11, 1974

[21] Appl. No.: 487,764

[30] Foreign Application Priority Data

July 26, 1973    Japan.......................... 48-88667[U]

[52] U.S. Cl................................ 92/117 A; 92/168; 277/59; 277/75
[51] Int. Cl.².................... F01B 15/02; F16J 15/18
[58] Field of Search.............. 92/117 A, 117 R, 168, 92/181; 277/27, 58, 59, 74, 75, 174

[56] References Cited
UNITED STATES PATENTS

| | | |
|---|---|---|
| 1,636,012 | 7/1927 | Olson et al............................ 277/75 |
| 3,089,680 | 5/1963 | Deve................................. 92/117 R |
| 3,150,564 | 9/1964 | Mc Mullen........................ 92/117 R |
| 3,315,968 | 4/1967 | Hanlon ................................. 277/27 |
| 3,497,038 | 2/1970 | Schrader et al....................... 92/168 |
| 3,743,303 | 7/1973 | Pope..................................... 277/75 |
| 3,804,424 | 4/1974 | Gardner............................... 277/74 |

*Primary Examiner*—Paul E. Maslousky

[57] ABSTRACT

A hydraulic cylinder is disclosed wherein a seal ring is fitted around the side surface of a plunger which in turn is fitted into a cylinder in such a way that there is a clearance between the seal ring and the plunger, and oil passages are formed through the seal ring, thereby at the lower part of the seal ring, exerting to the seal ring the upward force which may encounter the downward oil pressure exerted to the seal ring.

2 Claims, 2 Drawing Figures

HYDRAULIC CYLINDER

The present invention relates to a hydraulic cylinder.

In general, hydraulic cylinders used as the pushup cylinders in the hot rolling mills for controlling automatically the thickness of the rolled sheet are required to operate satisfactorily for a long time without any trouble or breakdown under such severe conditions that not only are they exposed to a large quantity of water and scales but also they are subject to the vertical load in the axial direction of the cylinder and also to the strong lateral load transmitted through the roll chocks whenever the stocks enter and leave the rolls. Furthermore the length of the cylinder is severely limited from the standpoint of economy, the diameter must be large, and the stroke must be short. Therefore, there have been taken various countermeasures against the lateral load.

Referring to the drawings.

Figure 1:
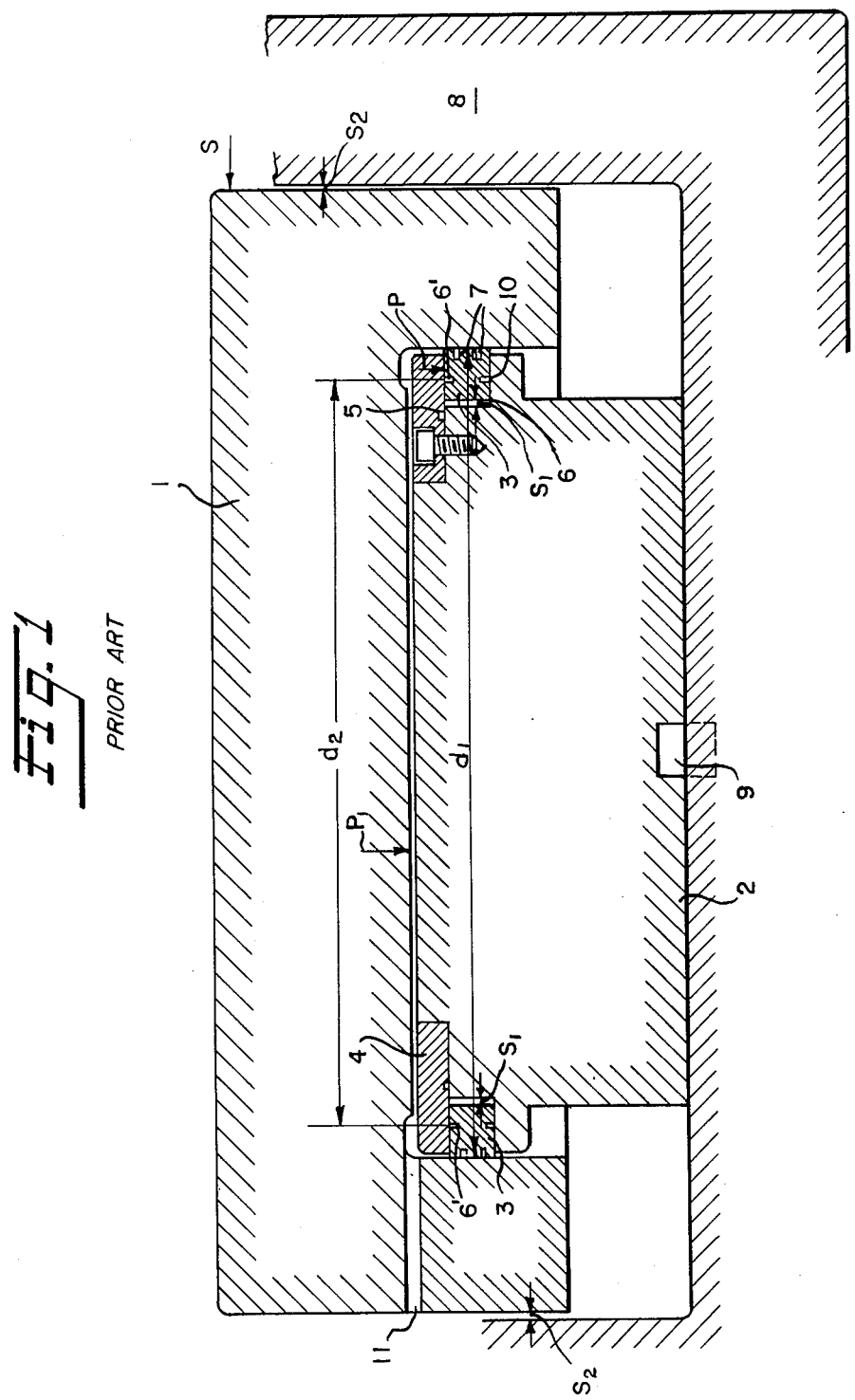
FIG. 1 is a cross sectional view of a prior art hydraulic cylinder.

The prior art hydraulic cylinder of the type shown in FIG. 1 has a cylindrical housing 8, and a plunger 2 is fixed with a pin 9 to the bottom of the housing 8 at the center thereof. A cylinder 1 is fitted over the plunger 2.

A seal ring 3 fitted over the upper side wall of the plunger 2 is retained in position by a seal ring retainer 4 having an O-ring 5. A radial packing 6 is attached to the under surface of the seal ring 3 while axial packings 7 are fitted over the side wall of the seal ring 3. A clearance $S_2$ is provided between the inner surface of the housing 8 and the outer side surface of the cylinder 1 while between the inner surface of the seal ring 3 and the outer surface of the plunger 2 is provided a clearance $S_1$ which is larger than the clearance $S_2$.

When the lateral load S is exerted upon the cylinder 1, the cylinder 1 first contacts with the seal ring 3 so that the latter is caused to be displaced laterally. However, there is provided a sufficiently large clearance $S_1$ between the inner surface of the seal ring 3 and the outer surface of the plunger 2, and this clearance $S_1$ is larger than the clearance $S_2$ between the housing 8 and the cylinder 1. Therefore the cylinder 1 and the seal ring 3 are only permitted to be displaced over a distance equal to the clearance $S_2$ so that the seal ring 3 is prevented from striking against the plunger 2. As a result, the inner wall of the cylinder 1, the outer side wall of the seal ring 3 and the packings 6 and 7 are prevented from being damaged when the lateral load S is exerted.

However, the above is true only when there is almost no friction at the interface 10 between the under surface of the seal ring 3 and the plunger 2. In practice, there arise many problems. First of all, when the working oil under pressure is forced through an oil port 11 and a vertical load is exerted upon the cylinder 1, the seal ring 3 is subject to the downward force P $$P \simeq \frac{\pi}{4}(d_1^2 - d_2^2) \times P_1$$

where $d_2$ = average diameter of radial packings 6', and
$d_1$ = outer diameter of seal ring 3.

when the hydraulic pressure $P_1$ is 200 Kg/cm$^2$, and the outer diameter of the seal ring 3 is 1,500 mm, the downward force P applied to the seal ring 3 is of the order of 300 to 500 tons. As a result, a frictional force of the order of 30 to 100 tons is produced at the interface or sliding surface between the seal ring 3 and the plunger 2. Consequently, the seal ring 3 cannot be smoothly displaced in the lateral direction when the lateral load S is exerted through the cylinder 1 to the seal ring 3, resulting in damage to the inner wall of the cylinder 1 and to the packings 7. As a result, the cylinder 1 cannot be displaced.

In view of the above, the primary object of the present invention is to provide a hydraulic cylinder which may substantially overcome the above problem, may prevent damage to the packings by smoothly displacing the seal ring when the lateral load is exerted thereto, and may be used for a long time.

Figure 2:
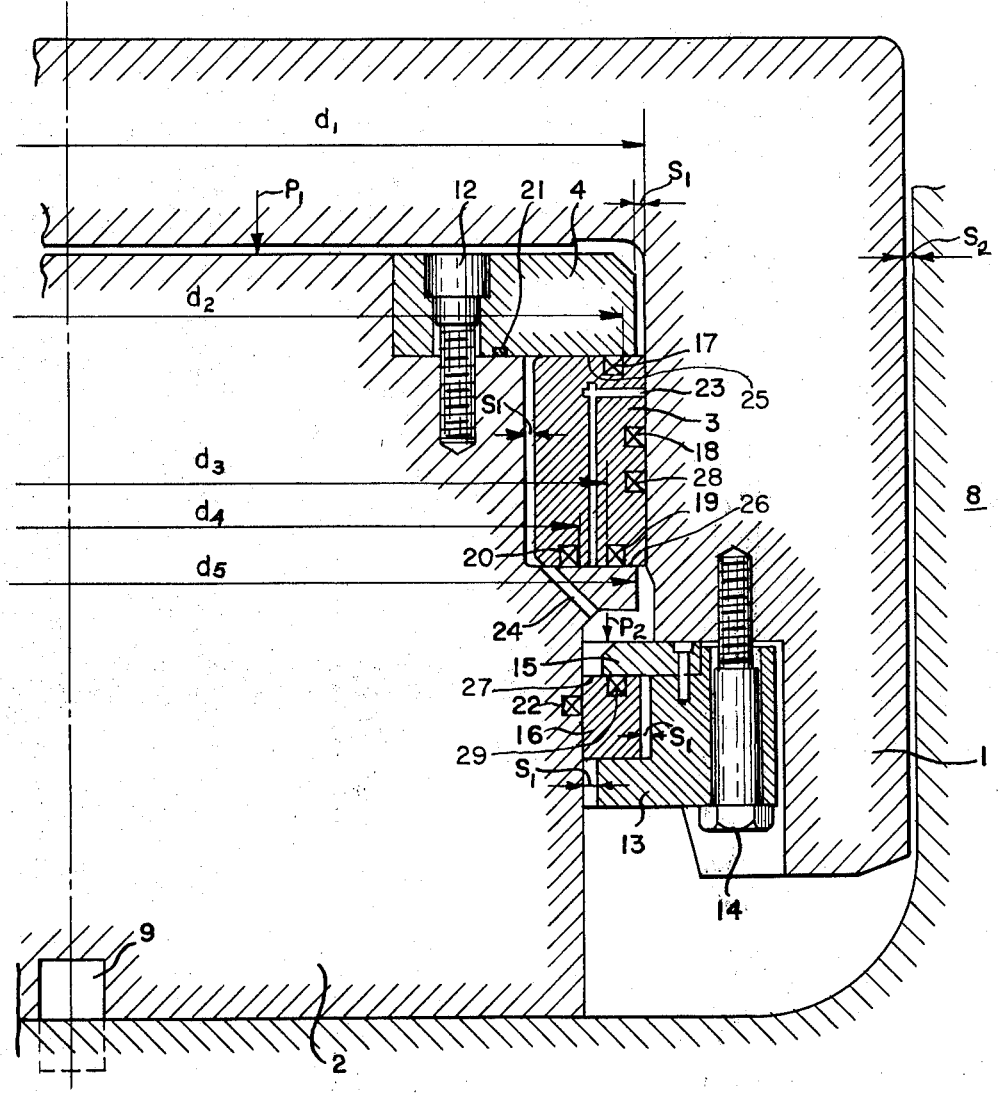
FIG. 2 is a cross sectional view of a hydraulic cylinder in accordance with the present invention.

Referring now to FIG. 2, the plunger 2 is fixed to the center of the bottom of the cylindrical housing 8 with the pin 9, and the cylinder 1 is fitted over the plunger 2. The seal ring 3 is fitted over the side wall of the plunger 2 and is firmly retained in position by the seal ring retainer 4 which in turn is fixed to the plunger 2 with a bolt 12 which passes through the under surface 25 of retainer 4.

At the lower end of the cylinder 1 is attached a cover 13 with a bolt 14, and a seal ring retainer 15 is attached to the upper surface of the cover 13. A seal ring 16 is interposed between the inner stepped portion of the cover 13 and the under surface of the seal ring retainer 15.

A radial packing 17 is attached to the upper surface of the seal ring 3 while axial packings 18, 28 are fitted around the side wall of the seal ring 3 and two lower radial packings 19 and 20 are coaxially attached to the lower surface of the seal ring 3. An O-ring 21 is interposed between the seal ring retainer 4 and the plunger 2, and an axial packing 22 is fitted around the side wall of the plunger 2 so as to be in contact with the seal ring 16. A radial packing 29 is attached to the upper surface of the seal ring 16 so as to be in contact with the under surface 27 of seal ring retainer 15.

One end of an oil passage 23 opens at the side wall of the seal ring 3 above the upper axial packing 18 while the other end opens at the lower end between the lower radial packings 19 and 20. An oil passage 24 is drilled through the plunger 2, passing through the upper surface 26 of a flange portion of plunger 2, in order to drain the oil which leaks in a small quantity into the space between the seal ring 3 and the plunger 2 through the upper and lower radial packings 17, 19 and 20.

The clearance $S_2$ is provided between the inner wall of the housing 8 and the outer wall surface of the cylinder 1 while clearances $S_1$ are also provided between the side wall of the seal ring retainer 4 and the inner wall of the cylinder 1, between the innerside wall of the seal ring 3 and the outer side wall of the plunger 2, between the outer side wall of the seal ring 16 and the inner side wall of the cover 13, and between the outer wall of the plunger 2 and the inner side wall of the cover 13. The clearances $S_1$ are made larger than the clearance $S_2$.

The high hydraulic pressure $P_1$ is transmitted from the outer side wall of the ring 3 through the oil passage 23 to the end surface between the lower radial packings 19 and 20 so that the upward force is exerted upon the seal ring 3. The low hydraulic pressure $P_2$ discharged from the oil passage 24 is exerted upon the lower end of the seal ring 3 on the outer side of the lower radial packing 19 so that the upward force is exerted upon the seal ring 3.

The downward force applied to the seal ring 3 is approximated to $$\frac{\pi}{4}(d_1^2 - d_2^2)P_1 + W + \frac{\pi}{4}(d_2^2 - d_4^2)P_2$$

where
W = weight of the seal ring 3;
$d_1$ = outer diameter of the seal ring 3;
$d_2$ = outer diameter of the upper radial packing 17;
$d_3$ = inner diameter of the outer lower radial packing 19;
$d_4$ = outer diameter of the inner lower radial packing 20; and
$d_5$ = outer diameter of the lower radial packing 19.

The upward force applied to the seal packing 3 is approximately given by $$\frac{\pi}{4}(d_3^2 - d_4^2)P_1 + \frac{\pi}{4}(d_1^2 - d_5^2)P_2$$

Therefore, it is seen that when the following condition is satisfied $$\frac{\pi}{4}(d_2^2 - d_4^2)P_2 + \frac{\pi}{4}(d_1^2 - d_2^2)P_1 + W = \frac{\pi}{4}(d_3^2 - d_4^2)P_1 + \frac{\pi}{4}(d_1^2 - d_5^2)P_2$$

the seal ring 3 may float so that it may be smoothly displaced laterally when the lateral load is exerted upon the seal ring 3 through the cylinder 1. Consequently no impact is produced between the inner wall of the cylinder 1 and the outer wall of the seal ring 3.

The clearance $S_2$ between the outer wall of the cylinder 1 and the inner wall of the housing 8 is smaller than the clearances $S_1$ between the inner wall of the seal ring 3 and the plunger 2 and between the outer wall of the seal ring 16 and the cover 13 so that the lateral displacement of the seal ring 3 is not limited at all and both the seal rings 3 and 16 may readily follow floatingly the frequent lateral displacements of the cylinder caused by a heavy lateral load. As a result, the packings are prevented from being damaged so that a long service life of the hydraulic cylinder may be ensured.

In the instant embodiment, the cover 13 is described as attached, but the present invention can be applied to a hydraulic cylinder of single action which does have not attached the cover. However it is a matter of course that the function becomes more effective when the cover 13 is attached.

Also in the instant embodiment, a lower radial packing is not attached to the seal ring 16 for the sake of balance and because the downward force $P_2$ which causes the seal ring 16 to press against the cover 13 is low. However, is required, a plurality of lower radial packings may be attached to the seal ring 16, and oil passages may be opened between them so that the balancing or upward force may be produced.

It is to be understood that the present invention may be also applied to a single-action hydraulic cylinder which has no seal ring 16.

As described hereinbefore, according to the present invention, the upward balancing force is exerted to the seal ring so that the latter may be floated so as be readily displaced laterally. Therefore, no impact force is produced between the inner wall of the cylinder and the outer wall of the seal ring when the lateral load is exerted upon the cylinder so that damage to the packings may be prevented and a long service life may be ensured.

What is claimed is:

1. A hydraulic cylinder arrangement of the type having a plunger positioned within a cylinder, the plunger being provided with a seal ring contacting the cylinder and said ring being spaced a slight distance from the plunger to provide a clearance, the invention which comprises a retainer carried by the plunger and contacting the upper surface of said ring, a member extending laterally of the plunger and contacting the lower surface of said ring, a plurality of spaced-apart radial packings carried by said ring and contacting said member, another radial packing carried by the ring and contacting said retainer, an oil passage formed in said seal ring having an upper end opening at the outer side of said ring and a lower end opening at the lower surface of said ring between said radial packings to conduct oil pressure supplied to the plunger and the upper surface of the seal ring to the area of contact between the lower surface of said ring and said member as defined by said spaced-apart radial packings to exert an upward force upon the seal ring.

2. A hydraulic cylinder arrangement as set forth in claim 1 which includes a cover secured to the lower end of the cylinder, and a seal ring positioned between the outer side surface of the plunger said cover.

* * * * *